United States Patent [19]

Fischer

[11] 3,875,350

[45] Apr. 1, 1975

[54] SELF-BALANCING HYBRID CIRCUIT

[75] Inventor: Russell C. Fischer, Wheaton, Ill.

[73] Assignee: GTE Automatic Electric Laboratories Incorporated, Northlake, Ill.

[22] Filed: Nov. 5, 1973

[21] Appl. No.: 402,564

[52] U.S. Cl. .......... 179/170 D
[51] Int. Cl. .......... H04b 1/52
[58] Field of Search .......... 179/170 R, 170 D, 170.6

[56] References Cited

UNITED STATES PATENTS

| | | | |
|---|---|---|---|
| 2,302,374 | 11/1942 | Mitchell | 179/170 D |
| 2,303,419 | 12/1942 | Affel | 179/170 D |
| 3,177,302 | 4/1965 | Fingerle | 179/170 D |
| 3,177,303 | 4/1965 | Fingerle et al. | 179/170 D |
| 3,178,521 | 4/1965 | Brown | 179/170 D |

*Primary Examiner*—Kathleen H. Claffy
*Assistant Examiner*—Randall P. Myers
*Attorney, Agent, or Firm*—Robert J. Black

[57] ABSTRACT

A self-balancing telephone-type hybrid having two sets of conjugate ports, wherein conjugacy is maintained between receiving and transmitting ports despite wide variations in impedance conditions at the line and/or balance ports. Included are means of differentiating between bridge unbalance due to impedance unbalance and that due to a signal being injected into the line port.

3 Claims, 1 Drawing Figure

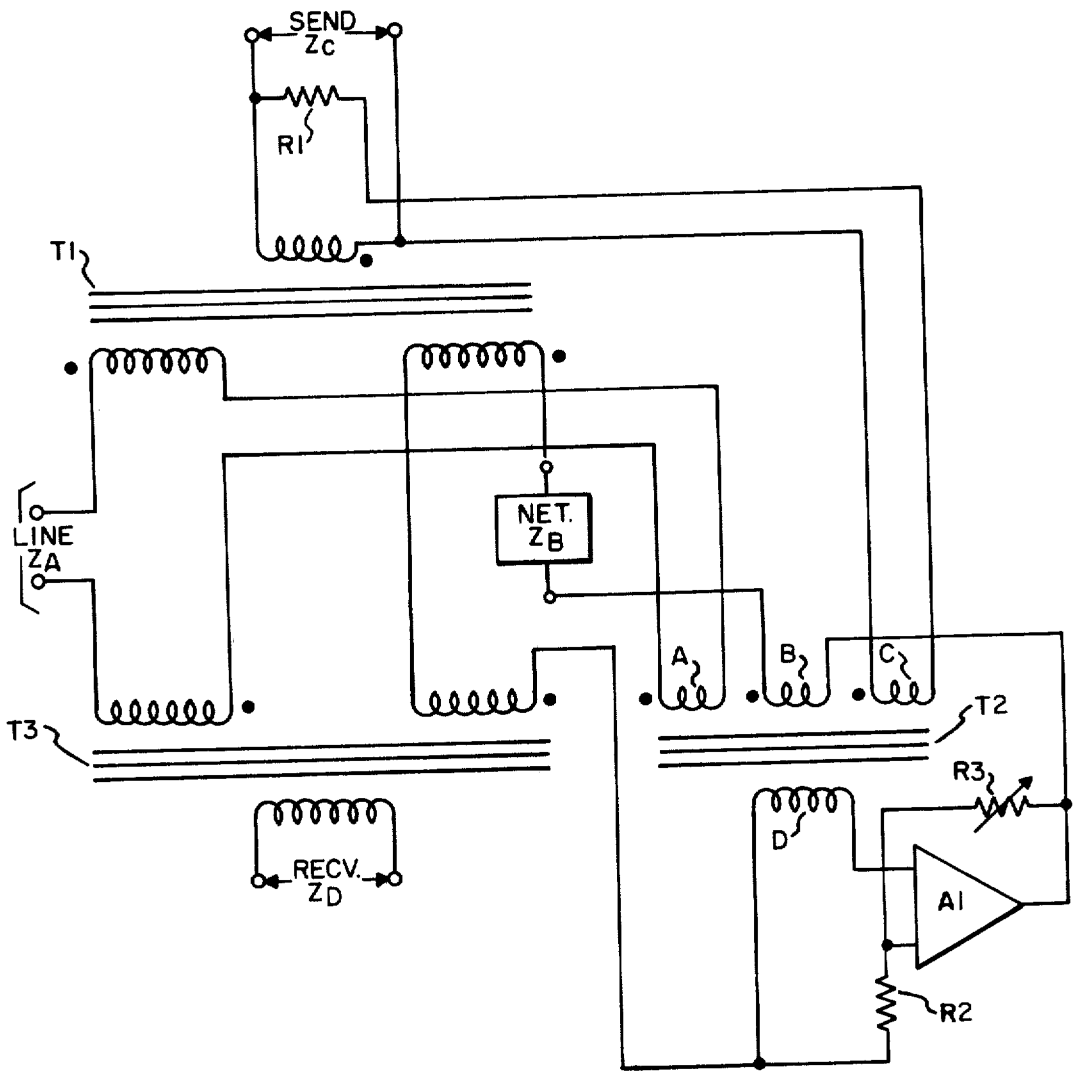
SEND
ZC
R1
T1
LINE
ZA
NET.
ZB
A
B
C
T2
T3
R3
D
A1
R2
RECV.
ZD

SELF-BALANCING HYBRID CIRCUIT

FIELD OF THE INVENTION

The present invention pertains to transmission in telecommunication system and particularly to applications where it is desired to convert a single two-way transmission path into two separate unidirectional transmission paths, and where the impedance characteristics of the two wire path may or may not be easily controlled or predicted. Specific applications include voice frequency repeaters, 2-wire to 4-wire interface circuits, electronic telephone circuits or loudspeaking telephones.

DESCRIPTION OF PRIOR ART

Telephone-type repeaters used on two wire transmission paths must be capable of providing simultaneous two way transmission, while at the same time remaining stable under a certain range of 2-wire line impedances conditions.

At present, there are two basic types of repeaters: The negative resistance type (such as the GTE Automatic Electric Incorporated Model AT6 or Western Electric Co. Model E-6) in which current and voltage are fed back into the facility in phase via series and shunt amplifiers respectively; and the hybrid repeater in which the 2 wire signal is split, via a bridge-type circuit (refered to as a hybrid), each provided with unidirectional gain in opposite directions, recombined via a second hybrid back into a 2 wire path. Operating principles of both of these types of repeaters are already well documented.

Basic to both types of repeaters is their sensitivity to the impedance of the 2-wire line as it appears at the repeater. The impedance of the line as seen by the repeater is a function of impedances irregularities along the line. These reflections manifest themselves as reflections of the signal sent out on the 2-wire line by the repeater. These reflections are then returned to the repeater, amplified, and sent out in the reverse direction where they may again be reflected back to the repeater.

In the case of a hybrid repeater, there is also a round-trip path via the hybrids and amplifiers. The design of the hybrid is normally such that the original currents injected into the two wire lines are matched by current injected into a network in such a way that virtually all of the signal power is split between the line and network and provides a high loss path for a signal in the round-trip path within the repeater. If the round-trip loss of the reflected signal is less than the round-trip gain, the circuit will oscillate. The normal techniques used to prevent this from happening are: (1) limiting repeater gain such that the round-trip gain is always less than the round-trip loss (assuming that, as is common in telephony, that each end of the circuit will be open or short circuited, causing a complete reflection) the result is a net circuit insertion loss; (2) impedance treatment of the line or impedance matching of the line by a usually complex network; (3) alternately switching gain on and off in each direction of transmission which present control problems as well as being sensitive to the propogation time of reflected signals. All of the above have the disadvantage that the circuit must be carefully engineered and/or the repeaters must be adjusted on a one-to-one basis to the cable pair because of normal variations in cable characteristics.

In the Lorain Products Corporation Model VRM 401/404/405 negative impedance repeaters, the use of unidirectional gain control is employed. In these repeaters, at any instant in the presence of a signal there is a gain in one direction and an equal loss in the reverse direction. Normally in the case of simultaneous signals the louder signal takes control of the circuit with the lower level signal being attenuated. With no signal, both directions operate at a net loss. With this type of repeater there are two disadvantages; (1) There is a signal level threshold below which the amplifiers do not operate: (2) Simultaneous transmission in both directions at equal gains is not possible since the repeater depends on the gain/loss differential for stable operation; (3) Gain Loss differential reduction results in a stability compromise. Working around these limitations requires extra application engineering effort to be sure that these limitations will not hurt performance.

Another approach, for Hybrid type repeaters has been proposed by GTE Automatic Electric Laboratories, in which AC current conditions in the line and network windings were compared and used to provide a correcting current in both the line and network circuits to rebalance the hybrid. Unfortunately this circuit provides transmission in one direction only. This is due to the fact that the circuitry which maintained current balance between the line and network ports, where the signal originated from the receive port, interpreted a signal entering the line winding as an unbalance, causing a balancing signal to be generated to attempt to maintain conjugacy between the receive and send ports, effectively preventing a signal to be generated at the transmit port. The invention decribed herein provides simultaneous 2-way transmission under a wide variety of line impedances without special treatment of the line, special amplifier restraints, or special adjustment of the hybrid balancing parameters.

SUMMARY OF THE INVENTION

The present invention consists of a conventional telephone-type hybrid circuit, a conventional amplifier, means for sensing current relationships among the various ports of the hybrid particularly the line, network, and transmit ports, and means for inserting appropriate corrective currents back into the hybrid circuit.

The conventional telephone hybrid generally consists of components connected in a current responding bridge configuration. The hybrid consists of 2 pair of conjugate ports: The receive and transmit pair; and the line and network (balance) pair. The object is to maintain the maximum possible loss between each pair of conjugate ports to provide maximum stability when gain is applied to the circuit.

In normal use, the object is for the maximum possible loss between the receive and transmit ports. This requires a specific relationship between the line and network currents. The present invention detects the current relationship between the line and network ports, and via an amplifier, inserts a current with the proper amplitude and phase relationship into the network port to maintain conjugacy between the receive and transmit ports. A particular feature of the present invention is that, at the same time, the transmit port current is monitored so that if a signal originates in the line port, the error signal resulting from the unbalance between the line and network port is nullified. In the present invention the magnitude and sense of the currents in the line, network and transmit ports of the hybrid are detected by a current-responding device such as a transformer.

Accordingly it is possible then, with the present invention to provide a high transhybrid loss for a wide range of line impedances with one fixed value of network impedance.

BRIEF DESCRIPTION OF THE DRAWING

The single sheet of drawings included herewith, disclose a hybrid circuit in accordance with the present invention.

DESCRIPTION OF THE PREFERRED EMBODIMENT

Referring now to the accompanying drawing the current magnitude and phase sensing means is represented by a transformer, T2, with windings A, B, C being responsive to the current magnitude and phase and winding D providing an output corresponding to the net flux produced by currents flowing in windings A, B, and C. The actual current responsive device may be any device or device combination which performs the function as described below.

The invention consists of a telephone-type hybrid or (T1 and T3) other similar bridge circuit in combination with a current-responsive circuit capable of operating on currents produced within the bridge and applying corrective currents to one or more arms of the bridge to obtain balanced conditions in the bridge. Likewise, means are provided to make this circuit operative in correcting the unbalance between first (line) and second (network) conjugate arms (line and network ports form on conjugate pair) of the bridge only when a signal is introduced in a third arm (receive) resulting in conjugacy between the third (receive) and fourth (send) arm (receive and send ports form a second conjugate pair).

In the present embodiment, employing a transformer as the current responsive means, the operation is as follows: Assume a signal is inserted into the hybrid with a source impedance $Z_D$ at the receive port in the bridge circuit shown in the drawing. When $Z_A$ and $Z_B$ have the proper relationship such that the net current thru $Z_C$ is zero, (i.e., receive and send ports are conjugate) the currents thru $Z_A$ and $Z_B$ will bear a specific amplitude and phase or polarity relationship to each other. Current thru winding A of Transformer T1 is responsive to current thru impedance $Z_A$. Likewise, winding B of transformer T2 is responsive to currents thru impedance $Z_B$. The turns and relative polarities of windings A and B are such that under the current relationships which produce zero current in impedance $Z_C$, the next flux in T2 produced is zero, resulting in no signal in winding D of T2. (The output impedance of the amplifier A1 is assumed to be zero). Under these conditions the amplifier produces no current in its output to act in series with $Z_B$.

Next, assume that the impedance $Z_A$ and/or $Z_B$ is no longer that which results in the current thru $Z_C$ being zero. Under this condition, the net flux produced by windings A and B of T2 as a result of the currents thru $Z_A$ and $Z_B$ is no longer zero, resulting in a voltage being induced across winding D of transformer T2. This signal is amplified by A1 and, the output having a negligible source impedance causes a current to flow in series with the series combination of winding B and $Z_B$ proportional to the net flux in T2 developed by the current thru windings A & B. The magnitude of the current originating at the output of A1 and its polarity relative to the current in winding B resulting from the previously mentioned change in the relationship between $Z_A$ and $Z_B$ is such as to cause the net resultant current thru $Z_B$ to be that current which results in no current thru $Z_C$. Any change in $Z_A$ will result in an error voltage being induced in winding D of T2, causing a correction signal to be applied to maintain current balance in the bridge to make the send port the conjugate of the receive port.

Now assume a signal with source impedance $Z_A$ is inserted in place of $Z_A$. In a conventional bridge, when $Z_C$ and $Z_D$ have the proper relationship no current will flow thru $Z_B$ (i.e., line and network ports are conjugate). With only windings A and B of transformer T2 connected, (and winding C replaced by a short circuit) the circuit will operate as described in the preceding paragraph and result in no current in $Z_C$ and hence no signal appears at the send port. However, the desired result in the circuit is a transfer of signal from a source appearing at the line port to the send port to $Z_C$. To accomplish this, winding C of transformer T2 is connected in series with $Z_C$. The turns and polarity relationship of winding C to winding A of T2 is such as to result in zero net flux in T2 for the above signal input at the line port, resulting in no error current being developed in T2. This action prevents the unbalance correction circuit from operating on signals originating at $Z_A$.

The total effect is the maintenance of hybrid balance over a wide range of impedance unbalance conditions between the line and network ports yet retaining the other desirable characteristics of hybrid operation. While but a single embodiment of the present invention has been shown, it will be obvious to those skilled in the art that numerous modifications of the present invention may be made without departing from the spirit and scope of the present invention, which shall be limited only by the claims appended hereto.

What is claimed is:

1. A self balancing hybrid circuit comprising: a hybrid transformer including a plurality of windings; a first conjugate pair of ports comprising a first port connectible to a two-way transmission line and to a first pair of said transformer windings and a second port connectible to a balancing network and to a second pair of said hybrid transformer windings, a second pair of conjugate ports comprising a first port connectible to a send channel and to a third winding of said hybrid transformer and a second port connectible to a receive channel and to a fourth winding of said hybrid transformer; sensing means including a first input circuit connection from said first port of said first conjugate pair, a second input circuit connection from said second port of said conjugate pair and a third input circuit connection from said port of said second conjugate pair connected to said send channel; whereby in response to detection of an unbalanced electrical relationship between signals at said first conjugate pair of ports resulting in electrical signals in said send channel port, said sensing means are operated to insert a compensating signal into said second port of said first conjugate pair to correct error signals resulting from electrical unbalance between said first and second ports of said first conjugate pair.

2. A self balancing hybrid circuit as claimed in claim 1 wherein: said sensing means include a transformer comprising a first primary winding connected to said first port of said conjugate pair; a second primary winding connected to said second port of said first conjugate pair a third primary winding connected to said send channel port and a secondary winding serially connected with said second primary winding connected to said second port of said first conjugate pair operated in response to signals conducted over said primary windings to couple a compensating signal to said second port of said first conjugate pair.

3. A self balancing hybrid circuit as claimed in claim 2 wherein: said sensing means further include amplifier means included between said secondary winding of said transformer and said second port of said first conjugate pair, operated to amplify said compensating signal.

* * * * *